(12) United States Patent
Xie et al.

(10) Patent No.: US 11,543,993 B1
(45) Date of Patent: Jan. 3, 2023

(54) FAST GARBAGE COLLECTION IN ZONED NAMESPACES SSDS

(71) Applicant: Western Digital Technologies, Inc., San Jose, CA (US)

(72) Inventors: Hongmei Xie, Sunnyvale, CA (US); Aajna Karki, San Jose, CA (US); Xiaoying Li, Fremont, CA (US); Ji-Hyun In, Saratoga, CA (US); Dhanunjaya Rao Gorrle, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/350,903

(22) Filed: Jun. 17, 2021

(51) Int. Cl.
*G06F 3/06* (2006.01)
*G06F 12/02* (2006.01)

(52) U.S. Cl.
CPC ............ *G06F 3/0652* (2013.01); *G06F 3/064* (2013.01); *G06F 3/0604* (2013.01); *G06F 3/0679* (2013.01); *G06F 12/0246* (2013.01); *G06F 12/0253* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 7,610,437 B2 * | 10/2009 | Sinclair | ................ | G06F 3/0652 711/104 |
| 7,984,084 B2 * | 7/2011 | Sinclair | ............... | G06F 16/1847 707/818 |
| 8,285,918 B2 * | 10/2012 | Maheshwari | ....... | G06F 12/0891 711/159 |
| 8,443,263 B2 * | 5/2013 | Selinger | ............. | G06F 11/1068 714/768 |
| 8,873,284 B2 * | 10/2014 | Sinclair | ............... | G06F 12/0246 365/185.11 |

(Continued)

FOREIGN PATENT DOCUMENTS

CN 112416811 A * 2/2021

OTHER PUBLICATIONS

Kwanghee Lee, et al, A New LSM-style Garbage Collection Scheme for ZNS SSDs, 2020, in 12th USENIX Workshop on Hot Topics in Storage and File Systems, HotStorage 20, 6 pp.

(Continued)

*Primary Examiner* — Christopher D Birkhimer
(74) *Attorney, Agent, or Firm* — Patterson + Sheridan, LLP; Steven H. VerSteeg

(57) ABSTRACT

A data storage device includes a memory device and a controller coupled to the memory device. The data storage device supports zoned namespace. The controller is configured to maintain a zone timestamp table that includes a corresponding timestamp for each zone and add a timestamp to each garbage collection block of the memory device. The controller is further configured to scan a garbage collection block from a last physical block address (PBA) entry to a first PBA entry, determine a zone timestamp for the scanned PBA entry, and compare the zone timestamp to a timestamp of the garbage collection block. The controller is further configured to create and maintain a zone timestamp table and create and maintain a zone based defragmentation table.

20 Claims, 10 Drawing Sheets

(56) References Cited

U.S. PATENT DOCUMENTS

| | | | |
|---|---|---|---|
| 9,223,693 B2* | 12/2015 | Sinclair | G06F 12/0246 |
| 9,336,133 B2* | 5/2016 | Sinclair | G06F 12/0246 |
| 9,348,746 B2* | 5/2016 | Sinclair | G06F 12/0246 |
| 9,465,731 B2* | 10/2016 | Sinclair | G06F 3/0688 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,830,098 B1* | 11/2017 | Lin | G11C 16/10 |
| 9,940,261 B2 | 4/2018 | Booth et al. | |
| 9,977,736 B2 | 5/2018 | Melik-Martirosian | |
| 10,067,882 B2 | 9/2018 | Imazaki et al. | |
| 10,108,543 B1* | 10/2018 | Duggal | G06F 11/1453 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,417,123 B1 | 9/2019 | Souri et al. | |
| 10,430,279 B1* | 10/2019 | Dittia | G06F 3/0656 |
| 10,642,731 B2 | 5/2020 | Hsiao et al. | |
| 10,650,885 B2 | 5/2020 | Li | |
| 10,795,812 B1* | 10/2020 | Duggal | G06F 3/067 |
| 10,983,715 B2* | 4/2021 | Sharoni | G06F 3/0631 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G06F 12/0873 |
| | | | 711/E12.008 |
| 2011/0161784 A1* | 6/2011 | Selinger | G06F 11/1016 |
| | | | 714/E11.002 |
| 2014/0215129 A1 | 7/2014 | Kuzmin et al. | |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0227602 A1* | 8/2015 | Ram | G06F 11/1456 |
| | | | 707/634 |
| 2016/0246713 A1* | 8/2016 | Choi | G06F 3/0608 |
| 2017/0123655 A1* | 5/2017 | Sinclair | G06F 3/061 |
| 2017/0357577 A1* | 12/2017 | Lee | G06F 3/067 |
| 2018/0004437 A1* | 1/2018 | Battaje | G06F 3/067 |
| 2018/0004650 A1* | 1/2018 | Battaje | G06F 12/1009 |
| 2018/0004651 A1* | 1/2018 | Battaje | G06F 11/1469 |
| 2018/0004652 A1* | 1/2018 | Battaje | G06F 12/0862 |
| 2018/0004656 A1* | 1/2018 | Battaje | G06F 12/1009 |
| 2020/0089420 A1* | 3/2020 | Sharoni | G06F 3/0631 |
| 2020/0097403 A1 | 3/2020 | Saxena et al. | |
| 2020/0310686 A1* | 10/2020 | Truong | G06F 3/067 |
| 2020/0409566 A1* | 12/2020 | Demoor | G06F 3/0629 |
| 2021/0089217 A1* | 3/2021 | Bjørling | G06F 3/064 |

OTHER PUBLICATIONS

Lars Nagel, et al, Time-efficient Garbage Collection in SSDs, Jul. 24, 2018, arXiv preprint arXiv: 1807.09313, 13 pp.

International Search Report and Written Opinion for International Application No. PCT/US2022/019772 dated Aug. 4, 2022.

* cited by examiner

FAST GARBAGE COLLECTION IN ZONED NAMESPACES SSDS

BACKGROUND OF THE DISCLOSURE

Field of the Disclosure

Embodiments of the present disclosure generally relate to zone-based data validity checks and garbage collection operations of a data storage device, such as a solid state drive (SSD).

Description of the Related Art

A host device sends data to a data storage device via host commands, where the data is sent in units of logical blocks (LBs). Each LB is identified by a logical block address (LBA). In zoned namespace (ZNS), multiple LBAs are grouped into a zone. For example, if a zone has a capacity of 64 MiB and each LB has a size of 64 KiB, then each zone includes 1024 LBAs, such that a first zone includes LBA-0 to LBA-1023.

Data is stored in a memory device of the data storage device in units of physical blocks (PBs). Each PB is identified by a physical block address (PBA). Each LBA is mapped to a PBA and the mapping is stored in an entry of a flash translation layer (FTL) mapping table (FTLMT), such that the data stored on the memory device may be located using the LBA of the data. When data operations occur, the mapping of LBAs to PBAs may need to be updated such that the new mapping is reflected in the FTLMT. However, outdated or invalid data may continue to be stored in the physical location of the memory device. In general, SSD will identify and move the valid data a new physical location of the memory device in order to claim back the space occupied by invalid data.

Data validity check involves visiting the FTLMT, which can be slow due to its large size, especially on large capacity SSDs. Therefore, there is a need in the art for an improved data validity check and garbage collection operation.

SUMMARY OF THE DISCLOSURE

The present disclosure generally relates to zone-based data validity checks and garbage collection operations of a data storage device, such as a solid state drive (SSD). A data storage device includes a memory device and a controller coupled to the memory device. The data storage device supports zoned namespace. The controller is configured to maintain a zone timestamp table that includes a corresponding timestamp for each zone and add a timestamp to each garbage collection block of the memory device. The controller is further configured to scan a garbage collection block from a last physical block address (PBA) entry to a first PBA entry, determine a zone timestamp for the scanned PBA entry, and compare the zone timestamp to a timestamp of the garbage collection block. The controller is further configured to create and maintain a zone timestamp table and create and maintain a zone based defragmentation table.

In one embodiment, a data storage device includes a memory device and a controller coupled to the memory device. The data storage device supports zoned namespace. The controller is configured to maintain a zone timestamp table that includes a corresponding timestamp for each zone and add a timestamp to each garbage collection block of the memory device.

In another embodiment, a data storage device includes a memory device and a controller coupled to the memory device. The data storage device supports zoned namespace. The controller is configured to scan a garbage collection block from a last physical block address (PBA) entry backwards to a first PBA entry, wherein each PBA entry comprises a logical block address (LBA) and data, determine which zone a scanned PBA entry corresponds to, check a zone timestamp table for a valid or invalid indication for the zone, check the zone timestamp table for a zone timestamp corresponding to a LBA of the scanned PBA entry, and compare the zone timestamp to a timestamp of the garbage collection block.

In another embodiment, a data storage device includes memory means and a controller coupled to the memory means. The controller is configured to create and maintain a zone timestamp table, create and maintain a zone based defragmentation table, and add a timestamp to each garbage collection block of the memory means.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to zone-based data validity checks and garbage collection operations of a data storage device, such as a solid state drive (SSD). A data storage device includes a memory device and a controller coupled to the memory device. The data storage device supports zoned namespace. The controller is configured to maintain a zone timestamp table that includes a corresponding timestamp for each zone and add a timestamp to each garbage collection block of the memory device. The controller is further configured to scan a garbage collection block from a last physical block address (PBA) entry to a first PBA entry, determine a zone timestamp for the scanned PBA entry, and compare the zone timestamp to a timestamp of the garbage collection block. The controller is further configured to create and maintain a zone timestamp table and create and maintain a zone based defragmentation table.

Figure 1:
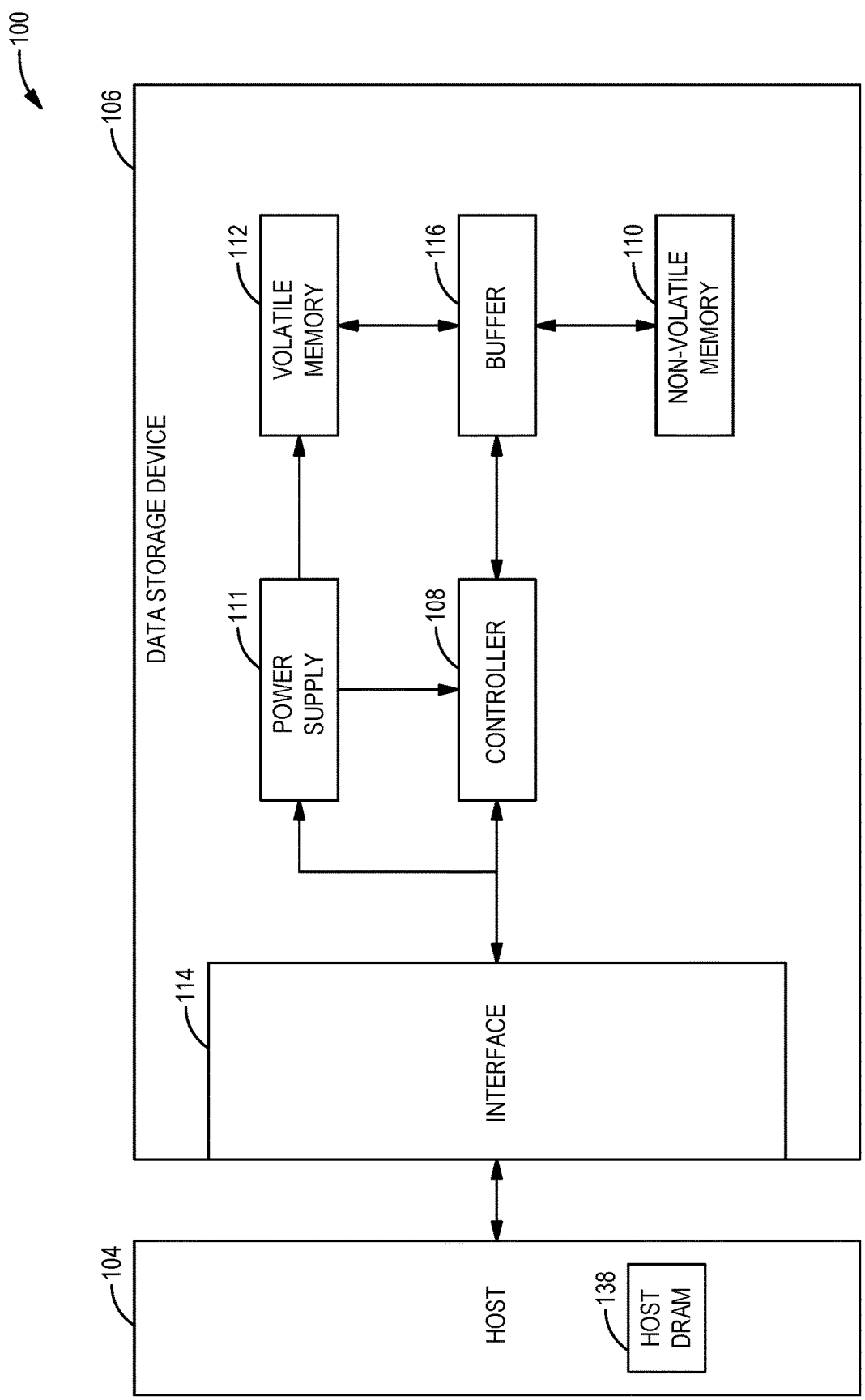
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

Figure 2:
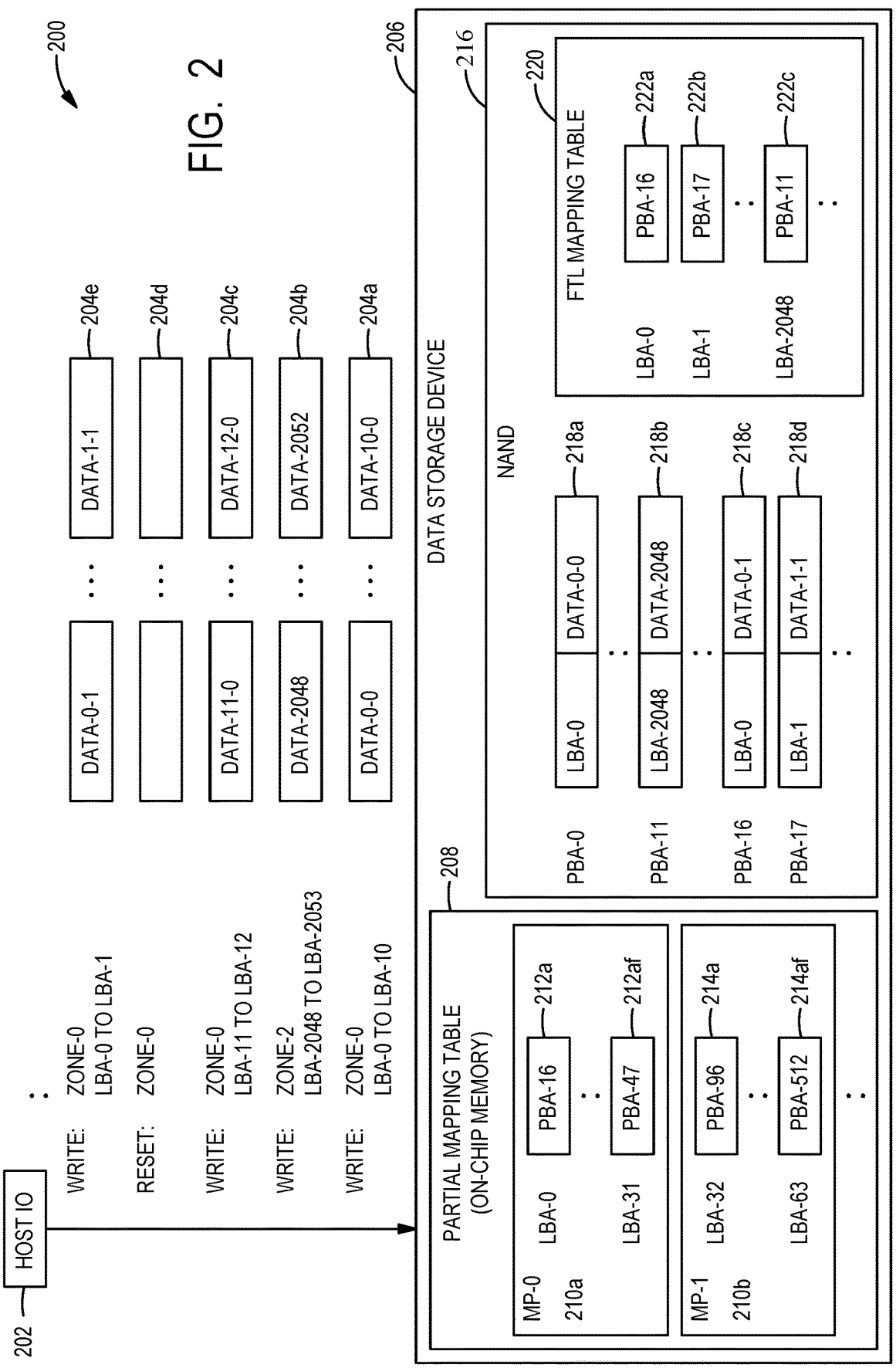
FIG. 2 is a schematic illustration of a sequential write and reset on zone namespace (ZNS) data storage device, according to certain embodiments.

FIG. 2 is a schematic illustration 200 of a sequential write and reset in a zone namespace (ZNS) data storage device 206, according to certain embodiments. The data storage device 206 may be the data storage device 106 of FIG. 1.

In ZNS data storage devices, data is programmed sequentially to each zone. In order to program data to a previous or skipped location of the zone, such as in an update or rewrite of data of a LB, the corresponding zone is reset and the first LBA of the zone may be written to again. In the description herein, a zone size is assumed to be about 64 MiB, where each LB size is about 64 KiB. It is to be understood that the previously listed values are not intended to be limiting, but to provide exemplary sizes for the embodiments described herein. A host device, such as the host device 104 of FIG. 1, includes a host input/output (IO) 202, where the host IO 202 sends host commands to the data storage device 206 and receives data from the data storage device 206. The host commands may include, but not limited to, write commands, reset commands, and reset commands.

For example, the host IO 202 may send a first command 204a, a second command 204b, a third command 204c, a fourth command 204d, and a fifth command 204e to the data storage device 206, where a controller, such as the controller 108 of FIG. 1 receives the plurality of host commands. The first command 204a corresponds with a write command to write data-0-0 to data-10-0 to zone-0 from LBA-0 to LBA-10. The second command 204b corresponds with a write command to write data-2048 to data-2052 to zone-2 from LBA-2048 to LBA-2053. The third command 204c corresponds with a write command to write data-11-0 to data-12-0 to zone-0 from LBA-11 to LBA-12. The fourth command 204d corresponds with a reset command to reset zone-0. The fifth command 204e corresponds with a write command to write data-0-1 to data-1-1 to zone-0 from LBA-0 to LBA-1.

When a zone reset command is received by the data storage device 206, the controller 108 resets the corresponding zone. For example, when the zone reset command for zone-0 is received, the data of zone-0 previously stored in the memory device becomes invalid. If the data storage device 206 does not support a rewrite of the media (e.g., does not support erasing data and rewriting the data, such as in SSDs), a unit of the memory device may include both valid and invalid data that belongs to different zones. The valid data may be temporarily or permanently moved to another location, such as programmed to a cache or another unit of the memory device, such as another physical block.

The data storage device 206 includes a partial mapping table (PMT) 208, a NAND 216, which may be the NVM 110 of FIG. 1, and a flash translation layer (FTL) mapping table (FTLMT) 220. The FTLMT 220 stores a mapping of LBAs to PBAs. The FTLMT 220 may be divided into mapping pages (MP), where only a portion of the MPs resides in the PMT 208. The PMT 208 may be stored in on-chip memory, such as volatile memory (e.g., SRAM and/or DRAM). The FTLMT 220 is stored in NAND 216. In some examples, the FTLMT 220 may also be stored in volatile memory, such as SRAM or DRAM.

The NAND 216 includes a plurality of PBAs, such as a first PBA-0 218a, a twelfth PBA-11 218b, a seventeenth PBA-16 218c, an eighteenth PBA-17 218d, and an nth PBA-n (not illustrated). Likewise the FTLMT 220 includes a plurality of logical to physical (L2P) entries, such as a first pair 222a mapping LBA-0 to PBA-16, a second pair 222b mapping LBA-1 to PBA-17, a 2049th pair 222c mapping LBA-2048 to PBA-11, and an nth pair (not illustrated) mapping LBA-n to PBA-m. The PMT 208 includes a plurality of MPs, such as a first MP-0 210a, a second MP-1 210b, and an nth MP-n (not illustrated). Each of the MPs includes a number of LBA to PBA pairs. For example, in the current embodiment, each MP includes 32 LBA to PBA pairs. MP-0 210a includes a first pair 212a mapping LBA-0 to PBA-16 and a 32nd pair 212af mapping LBA-31 to PBA-47. The second MP-1 210b includes a first pair 214a mapping LBA-32 to PBA-96 and a 64th pair 214af mapping LBA-63 to PBA-512.

When the first command 204a is received by the data storage device 206, the data of the first write command is programmed to the first PBA-0 218a and additionally needed sequential PBAs of the NAND 216. The twelfth PBA-11 218b includes the data of the second command 204b. When the fourth command 204d is received, zone-0 is reset. Then data of the fifth command 204e is programmed to the seventeenth PBA-16 218c, eighteenth PBA-17 218d, and onwards.

After each PBA programming, the FTLMT 220 and the PMT 208 may be updated, such that the current mapping information is added to the FTLMT 220 as an additional entry or as an updated entry. For example, the first pair 222a and the second pair 222b includes the LBA to PBA mapping of the fifth command 204e. The PMT 208 information may be utilized to determine whether data in the NAND 216 is valid or invalid during garbage collection operations.

Figure 3:
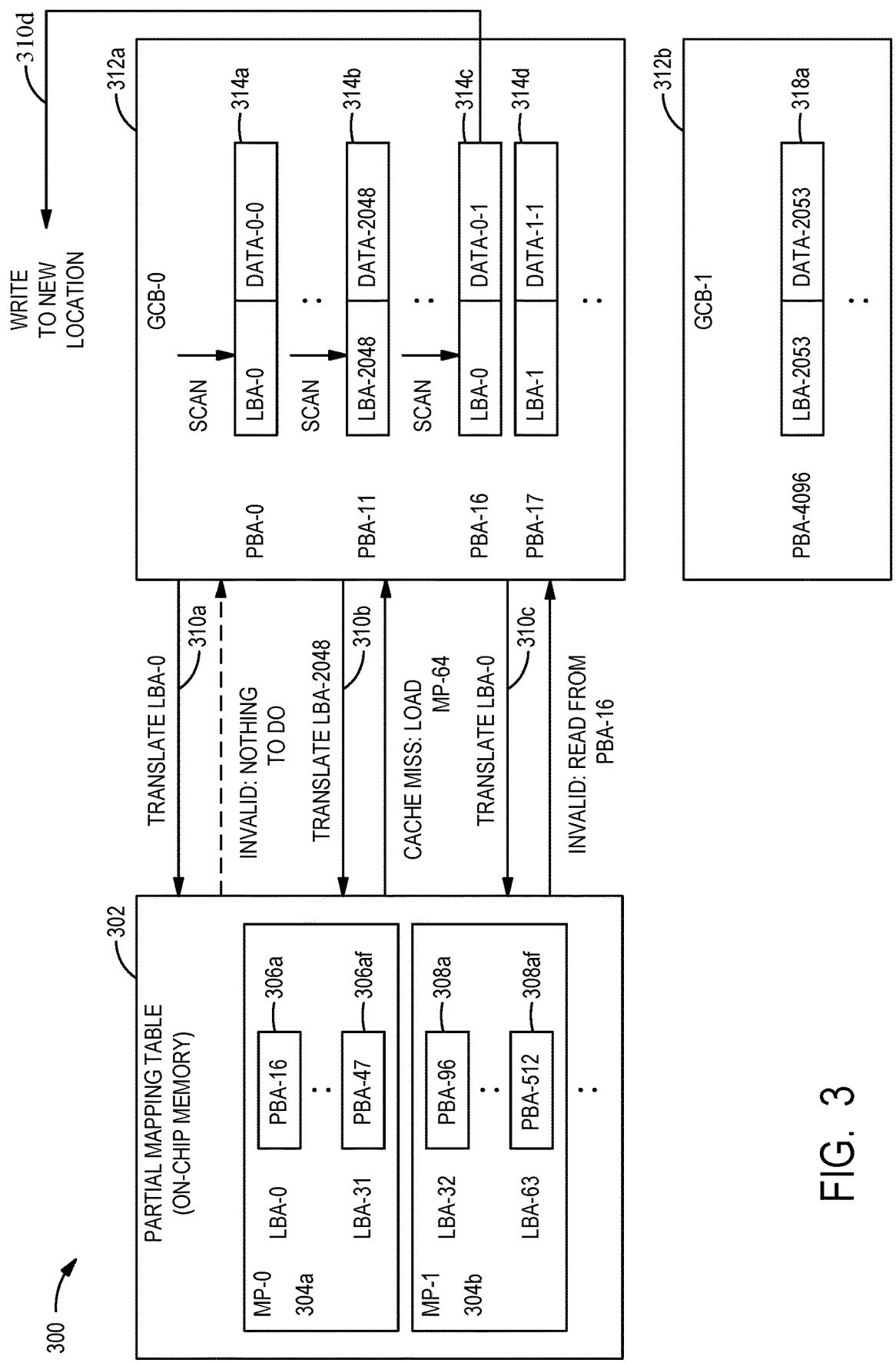
FIG. 3 is a schematic illustration of a translation for data validity check during garbage collection, according to certain embodiments.

FIG. 3 is a schematic illustration 300 of a translation for data validity check during garbage collection, according to certain embodiments. FIG. 3 illustrates a PMT 302, a first garbage collection block (GCB) 312a, and a second GCB 312b. Although only two GCBs are shown, more than and less than two GCBs are contemplated. Garbage collection operations may take place in a unit of multiple PBs. The unit of multiple PBs are defined as a GCB. When a garbage collection operation occurs, all physical blocks of a GCB may be erased, such that memory space may be reclaimed and provisioned to store new or updated data.

The PMT 302 may be the PMT 208 of FIG. 2. The PMT 302 includes a plurality of MPs, such as a first MP-0 304a, a second MP-1 304b, and an nth MP-n (not illustrated). Each of the MPs includes a number of LBA to PBA pairs. For example, in the current embodiment, each MP includes 32 LBA to PBA pairs. MP-0 304a includes a first pair 306a mapping LBA-0 to PBA-16 and a 32nd pair 306af mapping LBA-31 to PBA-47. The second MP-1 304b includes a first pair 308a mapping LBA-32 to PBA-96 and a 64th pair 308af mapping LBA-63 to PBA-512.

The first GCB-0 312a includes a first PBA-0 314a, a twelfth PBA-11 314b, a seventeenth PBA-16 314c, an eighteenth PBA-17 314d, and an nth PBA-n (not illustrated). The first PBA-0 314a is mapped to LBA-0 and data-0-0. The twelfth PBA-11 314b is mapped to LBA-2048 and data-2048. The seventeenth PBA-16 314c is mapped to LBA-0 and data-0-1. The eighteenth PBA-17 314d is mapped to LBA-1 and data-1-1. The second GCB 312b includes a 4097th PBA-4096 318a and an mth PBA-m (not illustrated). The 4097th PBA-4096 318a is mapped to LBA-2053 and data-2053.

During a garbage collection operation, a controller, such as the controller 108 of FIG. 1, first selects a GCB as a source block. For example, the first GCB-0 312a may be selected as the source block. The valid data of the source block, such as data-0-1 at the seventeenth PBA-16 314c, is moved into a new location of the NAND, such as the NAND 216 of FIG. 2. The source block, such as GCB-0 312a, is erased after all the valid data therein is moved to a new location. Data validity check is conducted using metadata stored with host data. For example, for the first GCB-0 312a, a first scan 316a occurs at the first PBA-0 314a to get metadata LBA-0, which indicates a (LBA-0, PBA-0) mapping.

However, the PMT 302 translates LBA-0 to PBA-16 at a first flow 310a. Therefore, data-0-0 at the first PBA-0 314a is invalid and the data is not moved. A second scan 316b at the twelfth PBA-11 314b and gets a cache miss from the PMT 302 at a second flow 310b. Therefore, MP-64 will be loaded before the PMT 302 is visited again for the twelfth PBA-11 314b. A third scan 316c at the seventeenth PBA-16 314c indicates a (LBA-0, PBA-16) mapping which is the same as the current entry in the PMT 302. Therefore, data-0-1 at the seventeenth PBA-16 314c is determined to be valid at a third flow 310c and will be moved to a new location in the memory device at a fourth flow 310d.

Figure 4A:
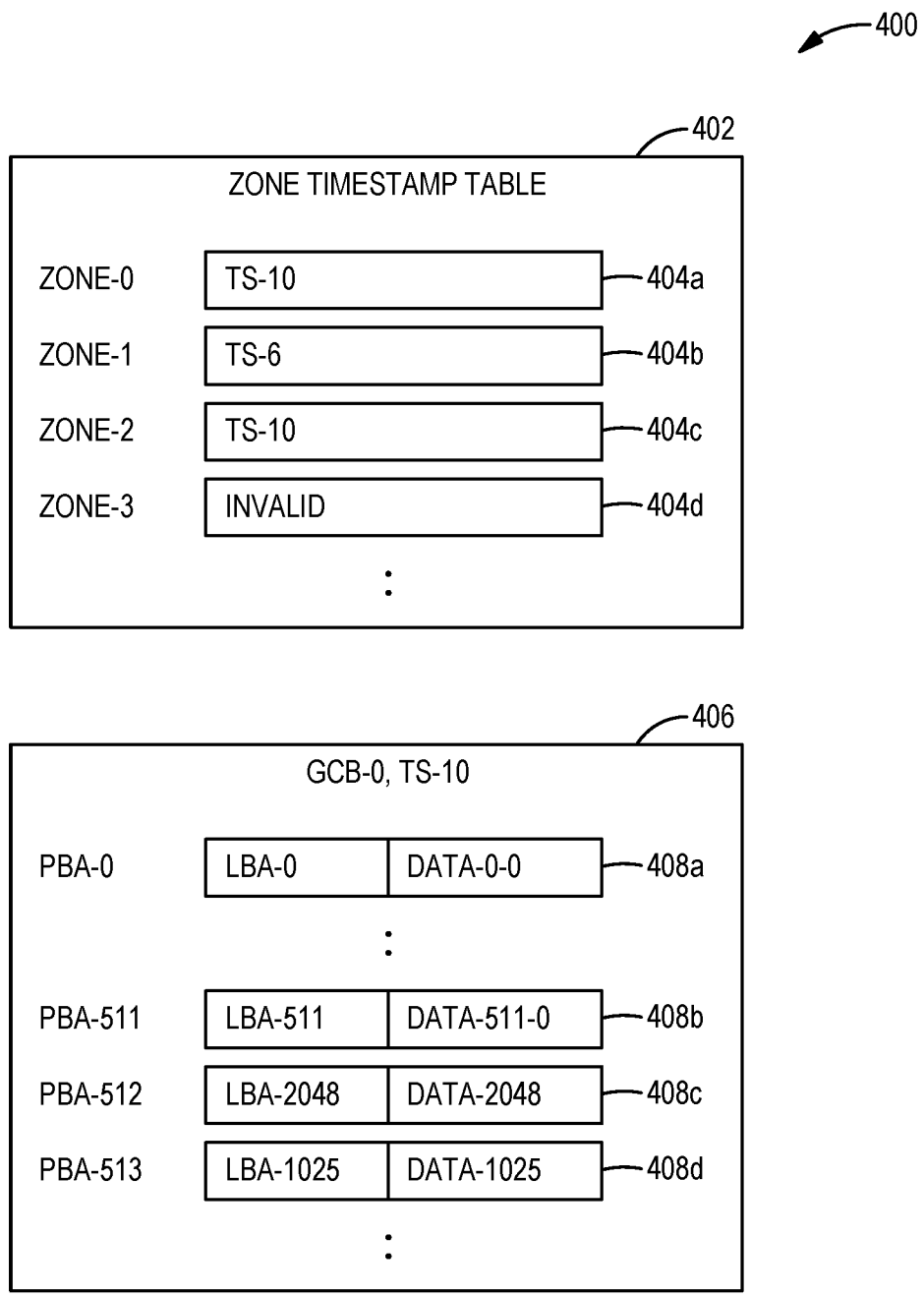
FIG. 4A is a schematic illustration of a zone timestamp table and a first garbage collection block (GCB), according to certain embodiments.

FIG. 4A is a schematic illustration 400 of a zone timestamp table 402 and a first garbage collection block (GCB) 406, according to certain embodiments. In order to determine which data belonging to the same zone is valid or invalid, such as data programmed before or after a zone reset command, a timestamp (TS) attribute is assigned to each provisioned GCB. As stated previously, each zone includes 1024 LBs. The previously listed size is not intended to be limiting, but to provide an example of a possible embodiment. For example, a first zone-0 404a includes LBAs 0-1023, a second zone-1 404b includes LBAs 1024-2047, a third zone-2 404c includes LBAs 2048-3071, a fourth zone-3 404d includes LBAs 3072-4095, and so-forth. The TS attribute is assigned to the first GCB allocated after the data storage device is initialized for a first time or during a first garbage collection operation in the lifetime of the memory device. Furthermore, each GCB may include a number of entries.

A zone's TS is the TS of the GCB where this zone's 1st LBA is written to, thus zone TS is updated upon each zone reset and rewrite. Therefore, when the current GCB is filled, another GCB is provisioned and a timestamp is provisioned to the new GCB. For example, a first GCB is associated with TS-0. When a second GCB is provisioned, the TS is incremented by 1, such that the second GCB is associated with TS-1. TS increases by 1 at each GCB allocation and is assigned to the GCB just allocated.

The first GCB-0 406 includes at least a first PBA-0 408a, a 512th PBA-511 408b, a 513th PBA-512 408c, and a 514th PBA-513 408d. The first GCB 406 is associated with an eleventh timestamp, timestamp TS-10. Each new start of a zone is assigned the same TS of the source GCB. For example, the 513th PBA-512 408c indicates a (LBA-2048, PBA-512) mapping. Because LBA-2048 is the first LBA of the third zone-2 404c, the timestamp of the source GCB (i.e., GCB-0 406) is assigned to the third zone-2 404c entry in the zone timestamp table 402. The zone timestamp table 402 includes entries for each zone, where zones that are initialized have a corresponding time stamp and zones that are not initialized are assigned an "invalid" timestamp. For example, the first zone-0 404a is assigned the TS-10 timestamp, the second zone-1 404b is assigned the TS-6 timestamp, the third zone-2 404c is assigned the TS-10 timestamp, and the fourth zone-3 404d is assigned the "invalid" timestamp since the fourth zone-3 404d has not been provisioned or initialized yet.

Regarding FIG. 4A, the first GCB-0 406 is associated with TS-10, such that the timestamp of the first GCB-0 406 is TS-gcb-0=TS-10. When the data of LBA-0 to LBA-511 of the first zone-0 404a are written to the first GCB-0 406, the entry in the zone timestamp table 402 corresponding to the first zone-0 404a is updated with TS-10 since LBA-0 is the first LBA of the first zone-0 404a. Similarly, the timestamp of the third zone-2 404c is defined as TS_zone-2=TS_gcb-0=TS-10 after LBA-2048 with data-2048 is written to GCB-0, where LBA-2048 is the first LBA of the third zone-2 404c. Zones never written to or provisioned by the host device or not yet rewritten to after a reset command is associated with the "invalid" timestamp, such as the fourth zone-3 404d. Note, however, that the second zone-0 404b has TS-6, which means that the first data written to LBA-1024 occurs in a GCB with timestamp TS-6, which has an earlier timestamp than GCB-0 406.

Figure 4B:
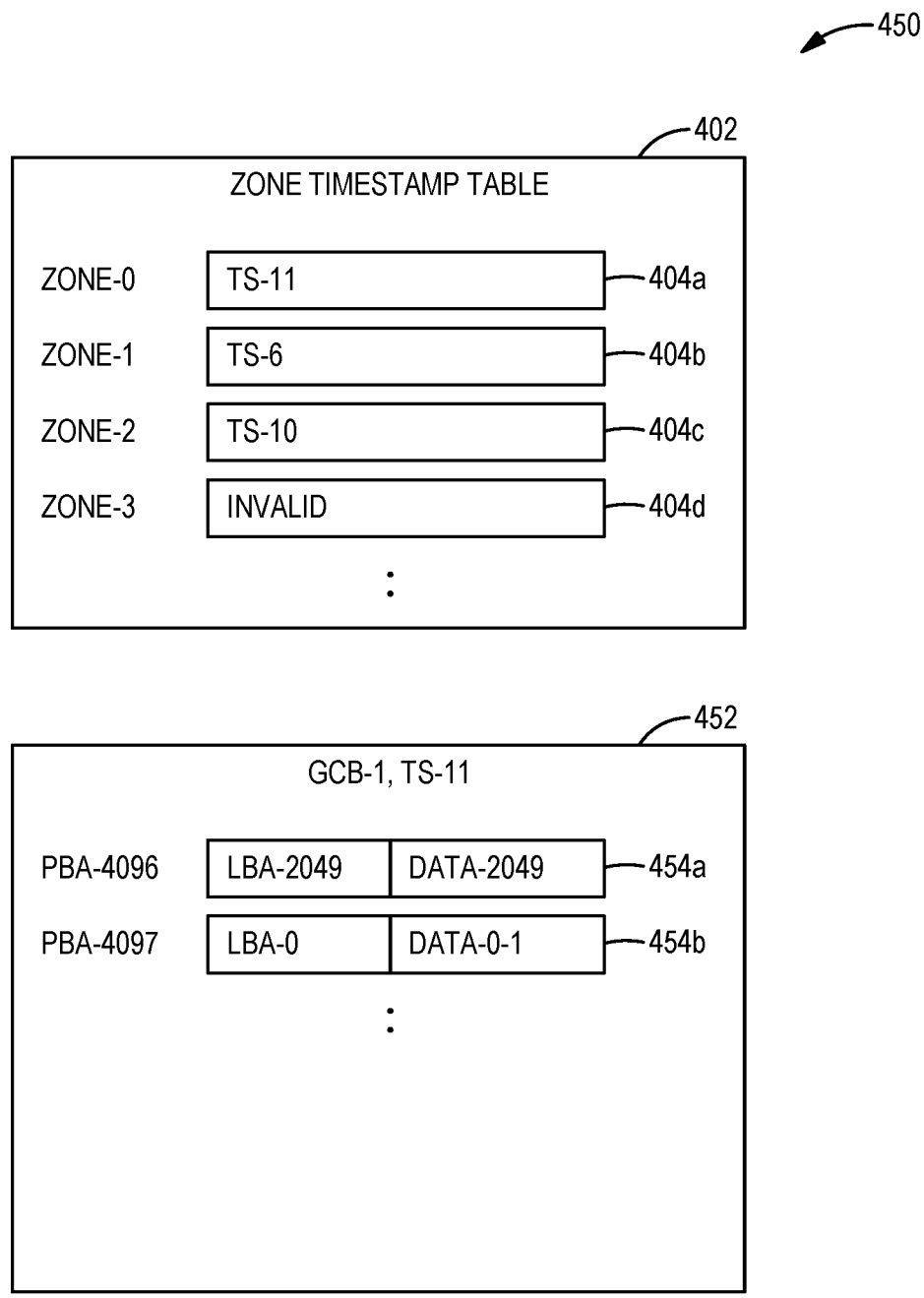
FIG. 4B is a schematic illustration of an updated zone timestamp table of FIG. 4A and a second garbage collection block (GCB), according to certain embodiments.

FIG. 4B is a schematic illustration 450 of the zone timestamp table 402 of FIG. 4A and a second garbage collection block (GCB) 452, according to certain embodiments. When the first GCB-0 406 is filled, the second GCB-1 452 is provisioned and the timestamp is incremented by 1 (TS_gcb-1=TS-11), such that the second GCB-1 452 is associated with TS-11.

The second GCB-2 452 includes a 4097th PBA-4096 454a and a 4098th PBA-4097 454b. Although LBA-2049 is associated with the third zone-2 404c and is written to the first PBA of the second GCB-1 452, the timestamp of the third zone-2 404c is not updated from TS-0 in the zone timestamp table because LBA-2049 is not the first LBA of the third zone-2 404c. However, when the first zone-0 404a is reset, and data-0-1 associated with LBA-0 is programmed to the 4098th PBA-4097 454b, the TS_zone-0 is updated to TS-11 in the first zone-0 404a entry in the zone timestamp table 402.

When the first GCB-0 406 is selected as the source GCB, three types of zone-based data validity checks using timestamps may be relevant. The zone-based validity check may be defined as: DataValid=(TS_zone<=TS_gcb). A first type indicates that TS_zone-0>TS_gcb-0 or TS-11>TS-10. Thus, the first zone-0 404a has its most recent reset and rewrite after the first GCB-0 406 is closed (therefore in the second GCB-1 452). Therefore, data-0-0 to data-511-0 in the first GCB-0 406 is invalid. A second type indicates that TS_zone-2=TS_gcb-0=TS-10. Thus, the third zone-2 404c most recent rewrite after reset is in the first GCB-0 406. Therefore, data-2048 in the first GCB-0 406 is valid. A third type indicates that TS_zone-1<TS_gcb-0 or TS-6<TS-10. Thus, the first zone-0 404a most recent rewrite occurred before the first GCB-0 406 was allocated. Therefore, data-1025 in the first GCB-0 406 is valid.

Figure 5:
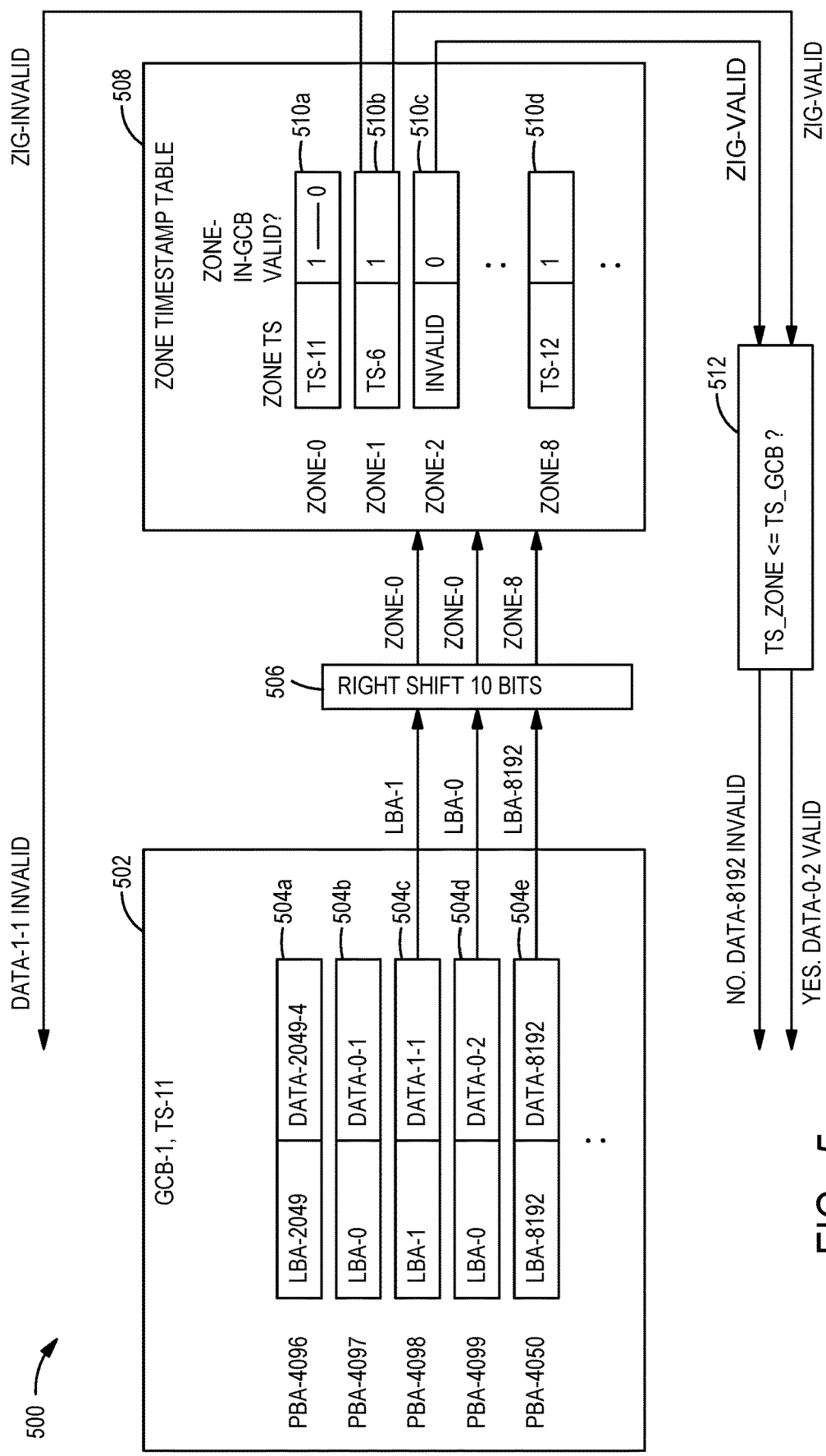
FIG. 5 is a schematic illustration of a zone-based data validity check for garbage collection, according to certain embodiments.

FIG. 5 is a schematic illustration 500 of a zone-based data validity check for garbage collection, according to certain embodiments. The schematic illustration 500 includes a second GCB-1 502, which may be the second GCB-1 452 of FIG. 4B, a shift module 506, a zone timestamp table 508, and a comparison logic 512. The second GCB-1 502 is associated with TS-11. The second GCB-1 502 includes a 4097th PBA-4096 504a, a 4098th PBA-4097 504b, a 4099th PBA-4098 504c, a 4100th PBA-4099 504d, a 4051st PBA-4050 504e, and an nth PBA-n (not illustrated). Each of the PBA entries is associated with an LBA and data. For example, the 4097th PBA-4096 504a is associated with LBA-2049 and data-2049-4.

The shift module 506 is configured to determine the zone of the LBA by shifting the LBA by a number of bits. For example, the LBA may be shifted 10 bits (assuming a 64 MiB zone capacity, a 64 KiB PB size, and therefore 1024=2^10 LBs per zone). Thus, an LBA, such as LBA-8192, is determined to be part of zone-8 and more specifically, the starting LBA of zone-8 510d, where the timestamp for zone-8 510d is TS-12. In other examples, the shift may determine a number of LBAs per zone, divide the LBA by the number of LBAs per zone, and round the resulting value down in order to determine the zone. The zone timestamp table 508 may be the zone timestamp table 402 of FIGS. 4A and 4B. However, rather than only tracking the timestamp of each zone, a zone-in-GCB valid (ZiG-Valid) bit is tracked for each zone in the zone timestamp table 508.

The ZiG-Valid bit may be initialized for each zone to a value of 1 before a host device, such as the host device 104 of FIG. 1, issues any Write command to any zone. Furthermore, when a zone is reset, the ZiG-Valid bit is also reverted back to 1. If the ZiG-Valid bit has a value of 1, the comparison logic 512 then determines data validity based on the corresponding zone timestamp obtained from zone timestamp table. For example, the comparison logic 512 may determine whether the TS_zone<=TS_gcb. If the TS_zone is less than or equal to the TS_gcb, then the comparison logic 512 returns a valid data indication for the data of the zone. Else, the comparison logic 512 returns an invalid data indication for the data of the zone. If the ZiG-Valid bit has a value of 0, the zone timestamp table 508 may directly return the "Invalid" indication.

Because a GCB may include a multiple versions of data of the same zone, a backwards scan may be utilized to determine zone-based data validity. The backward scan may include first performing a translation on the last PBA location in a GCB, then moving backwards one PBA to the second-from-last PBA, performing a translation on the second-from-last PBA, and so on. This way, when a first LBA of a zone is recognized in a GCB, a controller, such as the controller 108, determines that a rewrite to the zone has occurred. Therefore, the data of the zone programmed before the PBA location is invalid and the ZiG-Valid bit will be flipped from 1 to 0. The zone timestamp table 508 returns an invalid translation result if the target zone has the ZiG-Valid bit of 0. Otherwise, the zone timestamp table 508 routes, via the controller 108 or the logic of the controller 108, the validity check to the comparison logic 512.

Starting at the last PBA location in the second GCB-1 502, the 4051st PBA-4050 504e is scanned and the metadata LBA-8192 is shifted to get its zone index zone-8. The ZiG-Valid bit in the zone timestamp table 508 corresponding to zone-8 510d remains as a "1". Therefore, the next flow goes to the comparison logic 512, where the comparison logic 512 determines that the data-8192 in the second GCB-1 502 is invalid because TS_zone-8>TS_gcb-1. Thus, an invalid result is returned for data-8192 at the 4051st PBA-4050 504e.

After returning the invalid result for data-8192, the scan moves to the previous PBA, the 4100th PBA-4099 504d, with LBA-0 and Data-0-2. The shifting of LBA-0 in the shift module 506 results in zone index zone-0 510a, whose ZiG-Valid bit in the zone timestamp table 508 is still 1. Similarly, the next flow again goes to the comparison logic 512, where Data-0-2 is determined to be Valid since TS_zone-0=TS_gcb-1=TS_11.

Because LBA-0 is the first LBA of the first zone-0 510a, one extra operation on the zone timestamp table 508 is to flip the ZiG-Valid bit of zone-0 510a from 1 to 0, indicating that all remaining data of the first zone-0 510a in the second GCB-1 502 is invalid.

The next scan moves to the 4099th PBA-4098 504c, where LBA-1 points to the first zone-0 510a. Because the ZiG-Valid bit of the first zone-0 510a is already set to 0 due to the valid result of the 4100th PBA-4099 504d, the zone timestamp table 508 returns, via the controller logic, an invalid translation result for data-1-1. Likewise, the same occurs for the 4098th PBA-4097 504b since the ZiG-Valid bit is already set to 0 for the first zone-0 510a.

The zone timestamp table 508 may be updated during the garbage collection process, such as a reset to the third zone-2 510c resulting in the TS_zone-2 to be updated to the "invalid" timestamp. Since any reset and/or rewrite invalidates the previous data of a zone, the ZiG-Valid bit of the zone is set to 1 and serve next garbage collection query. It is contemplated that a host write can update a zone's TS, while the operation of moving of a data to a new GCB during garbage collection, even if associated with the first LBA of a zone, does not update the timestamp of the zone since the garbage collection operation does not change the "version" information of the data.

It is contemplated that the LBA information may be read from a designated memory location other than the metadata location of each PB inside the source GCB. Thus, a backwards read may be applicable at that designated memory location to the embodiments disclosed above.

It is contemplated that in some embodiments, only part of the data storage device capacity requires garbage collection, such as in hybrid SSDs, where the NAND or part of the NAND is used as a cache before data is routed to the main memory device to be stored. In those embodiments, the zone timestamp table may store the timestamps of a limited number of zones. The zone timestamp table also stores a zone index for zone timestamp queries and a cache miss returns the "invalid" timestamp result. Because the zone timestamp table only tracks a limited number of zones, the zone timestamp table may be stored on a fast on-chip memory, such as SRAM, instead of the DRAM.

Figure 6:
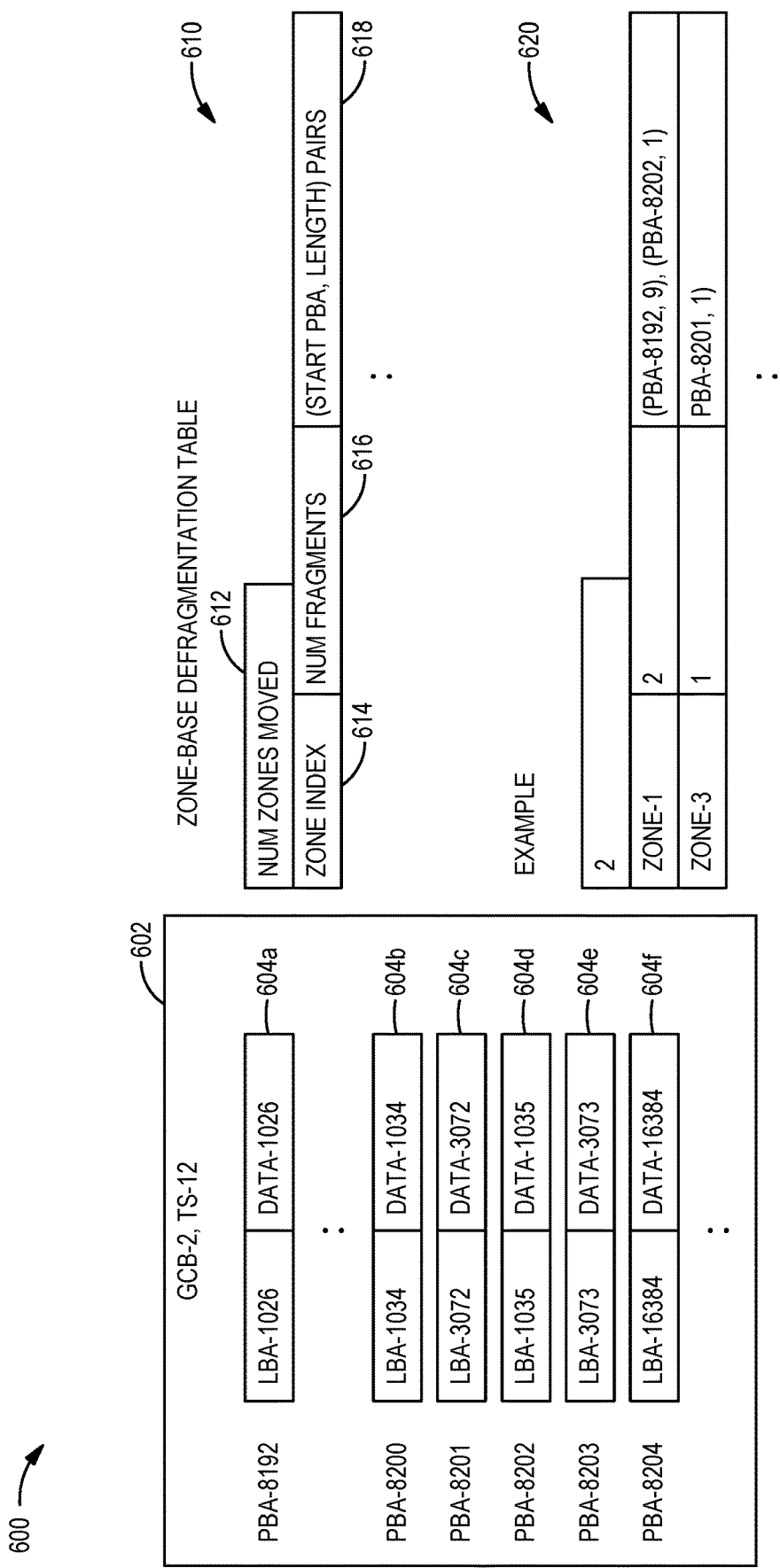
FIG. 6 is a schematic illustration of a zone-based defragmentation, according to certain embodiments.

FIG. 6 is a schematic illustration 600 of a zone-based defragmentation, according to certain embodiments. When valid data is recognized, such as in the previously described embodiments in FIGS. 4A, 4B, and 5, the valid data belonging to the same zone moved by the garbage collection operation is stored sequentially to a new GCB. It is noted that the sequential valid data may not be stored in physically adjacent PBs, thus the valid data may be fragmented.

For example, referring to GCB-2 602, not all data belonging to the second zone-1 are stored on adjacent blocks. The GCB-2 602 includes a PBA-8192 604a, PBA-8200 604b, PBA-8201 604c, PBA-8202 604d, PBA-8203 604e, and PBA-8204 604f. PBAs 8192-8200 and 8202 belong to the second zone-1 and PBAs 8201 and 8203 belong to the fourth zone-3. Because LBA-1035's data at PBA-8202 604*d* is not adjacent to LBA-1034's at PBA-8200 604*b*, the second zone-1's data is fragmented. Similarly, the fourth zone-3's data is also fragmented. Fragmented data may cause lower sequential read performance. For example, a read of zone-1's data from LBA-1026 to LBA-1035 may be slower than if zone-1's data were all physically adjacent. The lowered performance of the read may be due to NAND-level operations such as multiple copy operations to concatenate physically separated data before returning to the data of the read command to the host device.

If GCB-2 602 is current source GCB and both zone-1 and zone-3's data are valid, then PBA-8192 to PBA-8203's data will be moved to a new GCB in the same order. Thus, both zones' data will still be physically separated and may hinder sequential read performance. However, by keeping a zone-based defragmentation table 610, zones and the corresponding physical locations may be tracked, such that the data may be defragmented and stored physically sequential. The zone-based defragmentation table has a format that includes a number of entries of the table (NumZones Moved) 612, with each entry having a zone index (ZoneIndex) 614, a number of fragments (Num Fragments) 616, and a PBA pair tracking ((StartPBA, Length) pair) 618.

If the GCB-2 602 is current GC source and data-1026 of zone-1 at PBA-8192 is valid, then an entry for zone-1 is generated in the zone-based defragmentation table 610 with the Num Fragments 616 as 1 and the (StartPBA, Length) pair 618 as (PBA-8192, 1). Then, after reading zone-1's data-1027 at PBA-8193, determining that data-1027 is also valid, zone-1's current (StartPBA, Length) pair 618 will be updated to (PBA-8192, 2). The process moves on until PBA-8201 is scanned, where PBA-8201 is determined to be part of a different zone (i.e., zone-3). Therefore, zone-1's first pair of the (StartPBA, Length) pair 618 is (PBA-8192, 9) as shown in example 620.

After zone-3's data-3072 is deemed valid, the NumZones Moved 612 is updated to 2 and an entry for zone-3 with (PBA-8201, 1) is created, as shown in the example 620. Then, another pair (PBA-8202, 1) for zone-1 is added after the garbage collection finds data-1035 valid, as shown in the example 620. The zone-based defragmentation table 610 may be implemented in the embodiments described in FIGS. 4A, 4B, and 5.

After translation, the zone-based defragmentation table 610 is used to issue read commands from the source GCB so that data that belongs to the same zone will be written together sequentially in the new GCB. Thus, defragmentation may be realized. For example, a read of PBA-8192 604*a* to PBA-8200 604*b* will be immediately followed by read of PBA-8202 604*d*, where, the data of the PBA-8192 604*a* to PBA-8200 604*b* and the data of PBA-8202 604*d* are written sequentially or written as one sequential chunk to the new location of the memory device.

In one embodiment, each GCB may have a recorded number of zones, where the GCB with the lowest number of zones or multiple GCBs, if multiple GCBs have a same or similar valid count, is selected to perform a zone-based garbage collection and defragmentation operation on. In another embodiment, the zone-based defragmentation operation is performed on more than one GCBs, when the host device write pattern tends to store a same zone's data on multiple GCBs, in order to achieve better sequential read performance.

Figure 7:
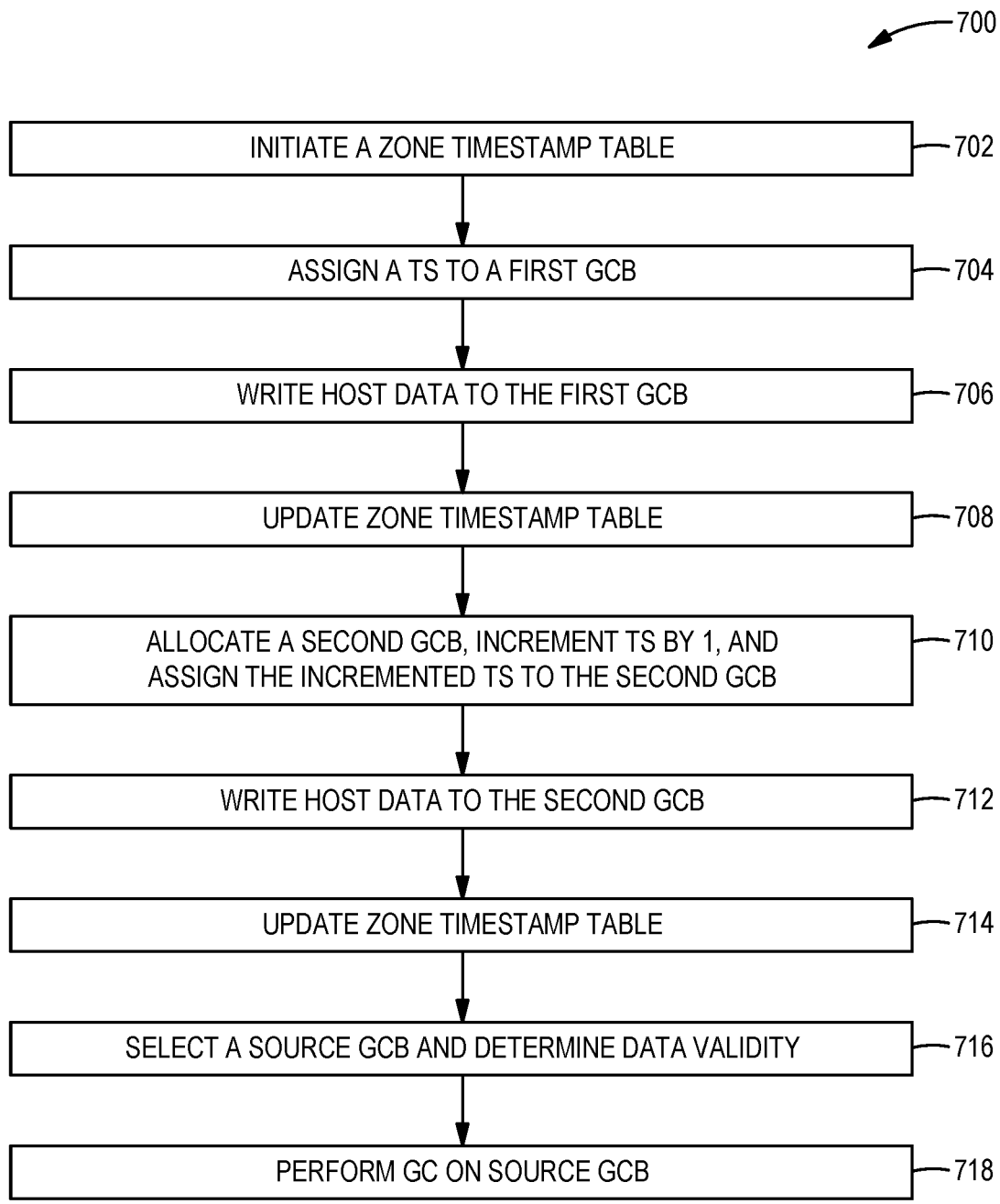
FIG. 7 is a schematic flow diagram of a method illustrating a zone-based garbage collection, according to certain embodiments.

FIG. 7 is a schematic flow diagram of a method 700 illustrating a zone-based data validity check for garbage collection, according to certain embodiments. The method 700 may be executed by a controller, such as the controller 108 of FIG. 1. The method 700 may be implemented by the embodiments described in FIGS. 4A, 4B, and 5. At block 702, a zone timestamp table is initiated. Initializing the zone timestamp table may include, but is not limited to, determining a number of zones of the data storage device, such as the data storage device 106 of FIG. 1, determining which zones have been programmed to, and storing the zone timestamp table in the respective memory location (e.g., volatile memory such as SRAM or DRAM or in a location of the NAND). At block 704, when the first GCB is initialized or provisioned, a timestamp is assigned to the first GCB. The timestamp starts at TS-0 when the first GCB is provisioned.

At block 706, host data is written to the first GCB. For example, the first GCB may accommodate data of a zone or multiple zones. At block 708, the zone timestamp table is updated. Following writing of each first LBA of each zone in the first GCB, the corresponding zone entry in the zone timestamp table is updated with the current timestamp. Referring to FIG. 4A, the first zone-0 404*a* in the zone timestamp table 402 is updated with a TS-10 timestamp when the zone-0's first LBA, LBA-0 is written to PBA-0 408*a* in the first GCB-0 406. The updating of the zone timestamp table may continue until all PBs of GCB-0 are filled up.

At block 710, a second GCB is allocated when the first GCB is filled to its capacity. When the second GCB is allocated, the timestamp is incremented by 1 and assigned to the second GCB. For example, the first GCB has a TS-0 timestamp. When the second GCB is allocated, the second GCB has a TS-1 timestamp. Likewise, when the third GCB is allocated, the third GCB has a TS-2 timestamp. At block 712, host data is written to the second GCB. For example, the second GCB may be updated with a number of entries relating to a zone or multiple zones of another garbage collection operation. At block 714, the zone timestamp table is updated for zones whose first LBA is written to the second GCB. For each first LBA of each zone in the second GCB, the corresponding zone entry in the zone timestamp table is updated with the current timestamp. Referring to FIG. 4B, the first zone-0 404*a* in the zone timestamp table 402 is updated with a TS-11 timestamp when zone-0's first LBA, LBA-0 is written to the 4098th PBA-4097 in the second GCB-1 452. The updating of the zone timestamp table may continue until GCB-1 is filled to capacity, and then continues with further update following host data written to a third GBC, and so on.

At block 716, garbage collection may be triggered, a source GCB such as the first GCB is selected, and the controller 108 determines if the data in the first GCB is valid or invalid. The checking of the data may include querying the zone timestamp table and if necessary, determining the following relationship: DataValid=(TS_zone<=TS_gcb). At block 718, garbage collection is performed on the source GCB's data. If the data is valid, such as the data-0-1 of the 17th PBA-16 314*c* of FIG. 3, the data is programmed to a new location of the memory device (e.g., a new location of NVM 110 of FIG. 1). It is to be understood that the embodiments of FIG. 6 may be implemented in the programming of valid data to a new location of the memory device. After all valid data is copied to a new location, the entire source GCB is then erased so that the memory device may reclaim the memory space.

Figure 8:
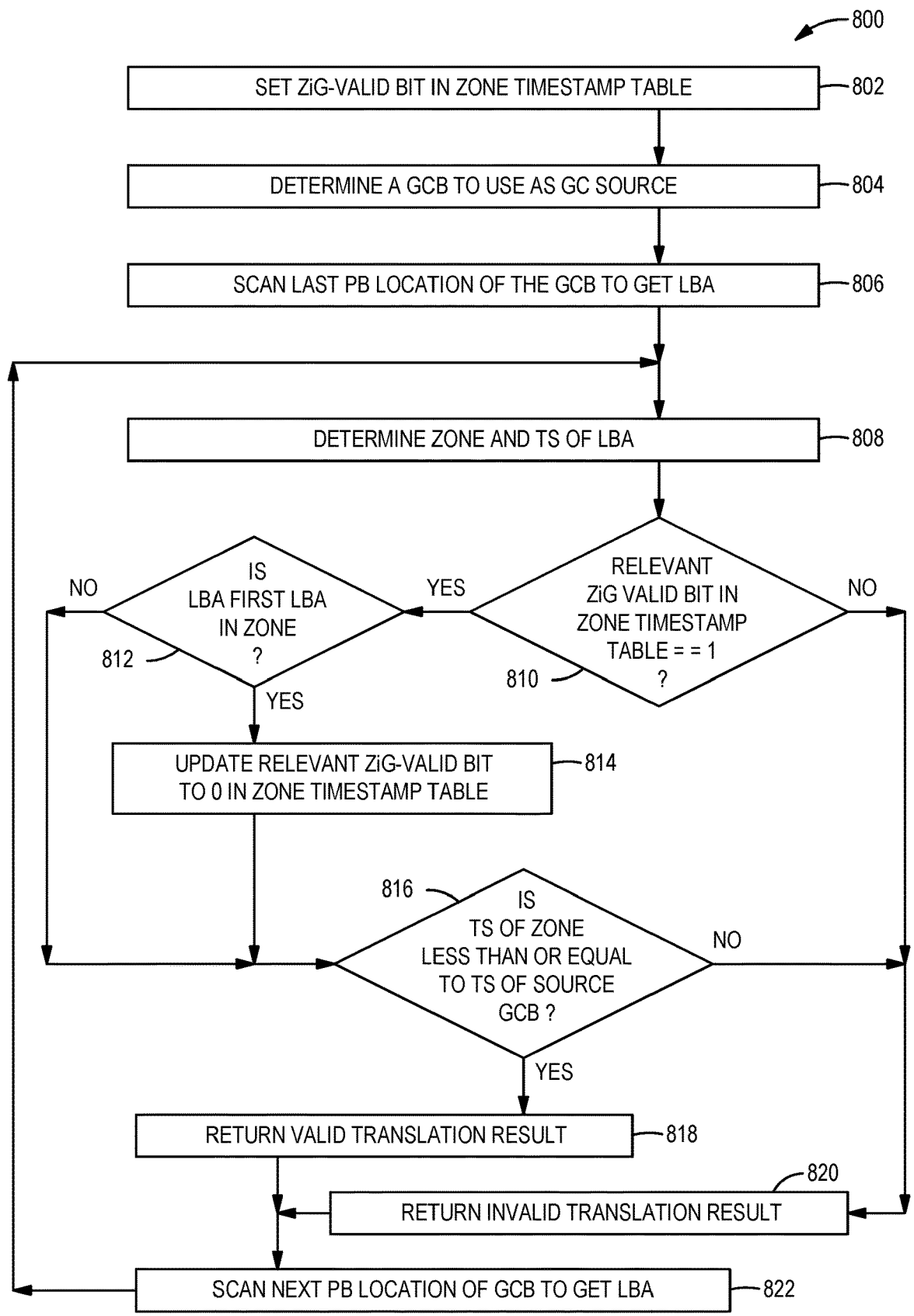
FIG. 8 is a schematic flow diagram of a method illustrating a zone-based data validity check for garbage collection, according to certain embodiments.

FIG. 8 is a schematic flow diagram of a method 800 illustrating a zone-based data validity check for garbage collection, according to certain embodiments. The method 800 may be executed by a controller, such as the controller 108 of FIG. 1. The method 800 may be implemented by the embodiments described in FIGS. 4A, 4B, and 5. At block 802, the ZiG-Valid bit is set in the zone timestamp table. Upon any Reset operation, including the initial state of the SSD prior to any host Write, the ZiG-Valid bit is set to 1 in the zone timestamp table. At block 804, a GCB is selected to use as a source GCB. For example, the second GCB-1 502 of FIG. 5 may be selected as the source GCB.

At block 806, the last location of the selected GCB is scanned to get its LBA information. For example, the last location of the second GCB-1 502 is the 4051st PBA-4050 504e, and the LBA corresponding to the 4051st PBA-4050 is LBA-8192. At block 808, the zone and timestamp of the LBA is determined. The zone determining may be done by a shift module, such as the shift module 506 of FIG. 5, which returns zone-8 for LBA-8192 is then used to retrieve its timestamp TS-12 in the zone timestamp table 508. At block 810, the controller 108 determines if the relevant ZiG-Valid bit in the zone timestamp table is equal to 1. For example, if zone-0 has its ZiG-Valid bit equal to 1, then the method 800 heads for first LBA determination at block 812. If the LBA is the first LBA of a zone at block 812, the ZiG-Valid bit for that zone is changed from 1 to 0 at block 814. Referring to FIG. 5, at the 4100th PBA-4099 504d, LBA-0 is the first LBA of the first zone-0 510a and the ZiG-Valid bit in the zone timestamp table 508 is updated from 1 to 0 for the first zone-0 510a. However, if the LBA is not the first LBA of the zone at block 812, the method 800 continues to block 816, where the controller 108 determines if the TS of the zone is less than or equal to the TS of the source GCB.

Since current ZiG-bit of 1 is returned in block 810, method 800 continues to block 816 to determine on data validity using zone TS for all LBA values, where the determining the data validity comprises determining if the TS of the zone is less than or equal to the TS of the source GCB. For example, zone-0's timestamp of TS-11 obtained from zone timestamp table 508 is fed into the comparison logic 512. A "True" result from the comparison logic 512 leads to returning a "Valid" translation result in block 818, such as for LBA-0 in PBA-4099 504d. Otherwise, an Invalid translation result is returned in block 820, such as for LBA-8192 in PBA-4050 504e.

If block 810 returns ZiG-Valid bit of 0, method 800 will directly go to block 820 to return "Invalid" translation result. For example, LBA-1 at the 4099th PBA-4098 504c returns ZiG-Valid bit of 0 for zone-0 510a from the zone timestamp table 508 in FIG. 5, and an "Invalid" translation result may be returned immediately.

At block 822, the PBA location in the GCB is decreased by 1 and the LBA, zone, and timestamp of the new location is determined. For example, after translating the 4051st PBA-4050 504e, the next translation occurs to the 4100th PBA-4099 504d such that a backwards scan occurs. The process from block 808 to block 822 is then repeated until all PBs in current source GCB are scanned.

Figure 9:
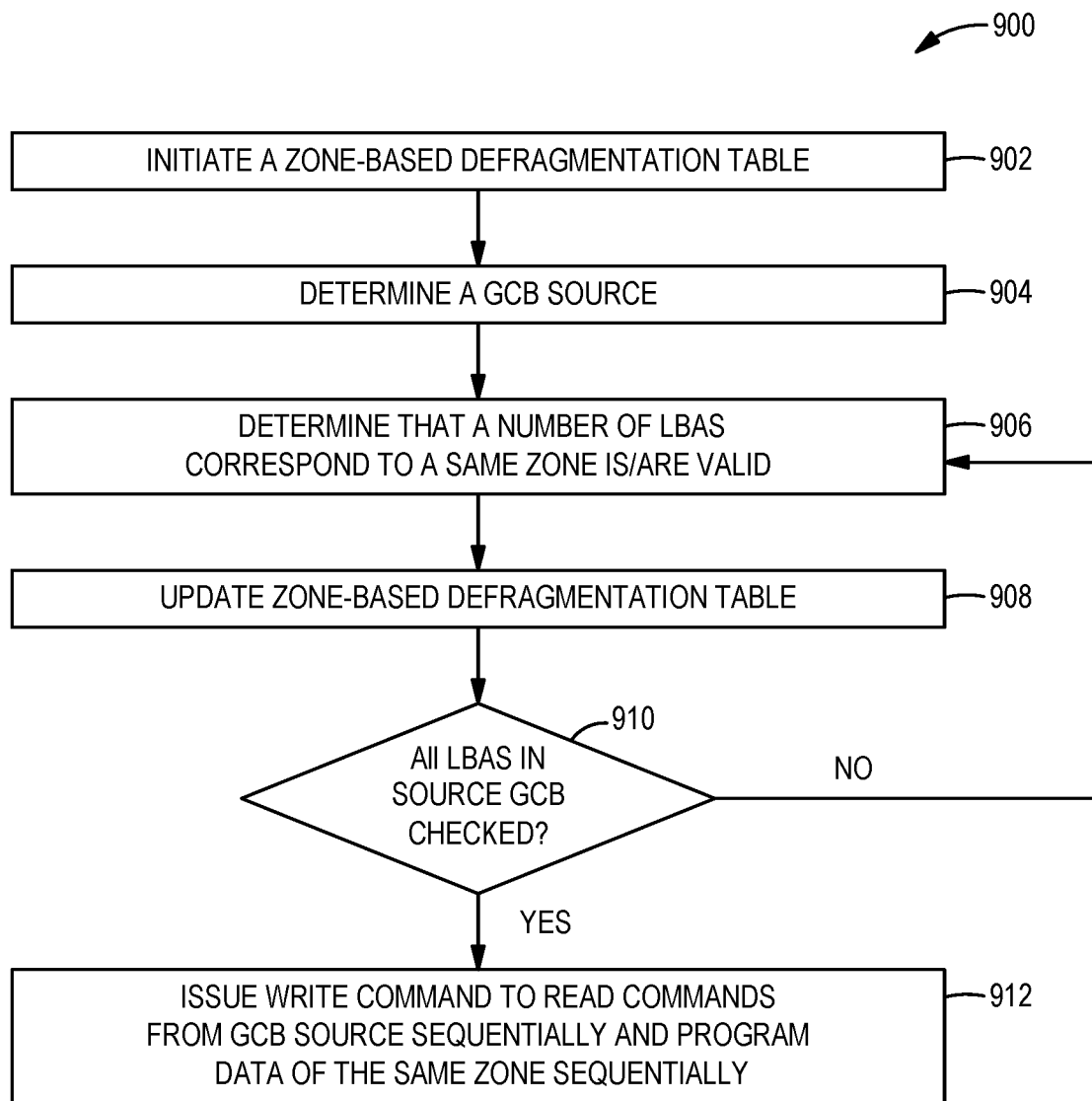
FIG. 9 is a schematic flow diagram of a method illustrating zone-based defragmentation during garbage collection, according to certain embodiments.

FIG. 9 is a schematic flow diagram of a method 900 illustrating zone-based defragmentation during garbage collection, according to certain embodiments. The method 900 may be executed by a controller, such as the controller 108 of FIG. 1. The method 900 may be completed after determining the valid and invalid data of the relevant GCB in the methods 700 and 800. Aspects of FIG. 6 may be utilized in the description of the method 900 for exemplary purposes. At block 902, a zone-based defragmentation table 610 is initiated. At block 904, a GCB source is determined. For example, the GCB source may be GCB-2 602. At block 906, the controller 108 determines that a number of LBAs that belong to the same zone is valid. For example, the LBAs may correspond to LBA-1026 to LBA-1034 belonging to zone-1 of PBA-8192 604a to PBA-8200 604b. At block 908, the zone-based defragmentation table 610 is updated. The NumZones Moved 612 is set to 1, the ZoneIndex is set to Zone-1, the Num Fragments 616 is 1, and the (StartPBA, Length) pairs 618 is set to (PBA-8192, 9).

At block 910, the controller checks if all LBAs in current source block have been checked. If not, method 900 returns to block 906 to examine the next batch of LBAs belonging to the same zone. If those LBAs are valid, the zone-based defragmentation table 610 will be updated at block 908. For example, the LBAs may correspond to LBA 3072 belonging to zone-3 of PBA-8201 in FIG. 6. The zone-based defragmentation table update includes increasing the Num Zones Moved to 2 and adding a new entry with Zone Index of Zone-3, Num Fragments of 1, and (StartPBA, Length) pair of (PBA-8201, 1).

At block 910, the controller 108 determines if all the LBAs in the source GCB have been checked (e.g., examining all of the physical blocks of the source GCB). If all LBAs have been examined at block 910, method 900 advances to block 912, where a write command is issued. The write command may include reading commands from the GCB source sequentially using the zone-based defragmentation table 610 and programming the data of the same zone sequentially, such as in adjacent blocks or locations.

It is to be understood that while garbage collection operations are described in the embodiments above, the described embodiments may be applicable for data management operations of moving valid data to a new location in the memory device.

By accurately tracking valid and invalid data of zones for garbage collection operations, translation operations may be improved and the garbage collection operation may be accelerated.

In one embodiment, a data storage device includes a memory device and a controller coupled to the memory device. The data storage device supports zoned namespace. The controller is configured to maintain a zone timestamp table that includes a corresponding timestamp for each zone and add a timestamp to each garbage collection block of the memory device.

The controller is configured to determine that the corresponding timestamp for a zone is greater than the timestamp for a garbage collection block, wherein the zone has data in the garbage collection block, and wherein the data for the zone is invalid. The controller is configured to determine that the corresponding timestamp for a zone is less than the timestamp for a garbage collection block, wherein the zone has data in the garbage collection block, and wherein the data for the zone is valid. The controller is configured to determine that the corresponding timestamp for a zone is equal to the timestamp for a garbage collection block, wherein the zone has data in the garbage collection block, and wherein the data for the zone is valid. The maintaining the zone timestamp table includes updating a zone timestamp for a zone when the zone is reset and new data is written to a first logical block address (LBA) of the zone. The maintaining the zone timestamp table includes changing a timestamp for a zone from invalid to a timestamp that matches a timestamp of a corresponding garbage collection block in which a first logical block address (LBA) of the zone is written. The adding a timestamp to each garbage block includes adding the timestamp when the garbage collection block is allocated.

In another embodiment, a data storage device includes a memory device and a controller coupled to the memory device. The data storage device supports zoned namespace. The controller is configured to scan a garbage collection block from a last physical block address (PBA) entry backwards to a first PBA entry, wherein each PBA entry comprises a logical block address (LBA) and data, determine which zone a scanned PBA entry corresponds to, check a zone timestamp table for a valid or invalid indication for the zone, check the zone timestamp table for a zone timestamp corresponding to a LBA of the scanned PBA entry, and compare the zone timestamp to a timestamp of the garbage collection block.

The determining which zone includes shifting an LBA a number of bits to the right. The controller is configured to initialize all zones to valid prior to host write commands. The controller is configured to change a zone to invalid after determining a first LBA of the zone has been found to be valid. After comparing the zone timestamp to the timestamp of the garbage collection block, the controller is configured to indicate the data is invalid when the zone timestamp is greater than the timestamp of the garbage collection block. After comparing the zone timestamp to the timestamp of the garbage collection block, the controller is configured to indicate the data is valid when the zone timestamp is equal to or less than the timestamp of the garbage collection block. The controller is configured to update a zone defragmentation table with a beginning PBA for each zone and number of consecutive PBAs. The zone defragmentation table is updated prior to performing the operation of moving valid data to a new location.

In another embodiment, a data storage device includes memory means and a controller coupled to the memory means. The controller is configured to create and maintain a zone timestamp table, create and maintain a zone based defragmentation table, and add a timestamp to each garbage collection block of the memory means.

The zone-based defragmentation table includes an indication of a number of zones moved, a zone index, an indication of a number of fragments of data pairs, and an index of the data pairs that are fragmented. The index of data pairs that are fragmented includes a physical block address (PBA) starting location and a run length for the PBA. The zone timestamp table includes a timestamp corresponding to each zone. The zone timestamp table comprises an indication of whether the zone in the garbage collection block is valid.

While the foregoing is directed to embodiments of the present disclosure, other and further embodiments of the disclosure may be devised without departing from the basic scope thereof, and the scope thereof is determined by the claims that follow.

What is claimed is:

1. A data storage device supporting zoned namespace, comprising:
   a memory device; and
   a controller coupled to the memory device, wherein the controller is configured to:
   maintain a zone timestamp table that includes a corresponding timestamp for each zone; and
   add a timestamp to each garbage collection block of the memory device.

2. The data storage device of claim 1, wherein the controller is configured to determine that the corresponding timestamp for a zone is greater than the timestamp for a garbage collection block, wherein the zone has data in the garbage collection block, and wherein the data for the zone is invalid.

3. The data storage device of claim 1, wherein the controller is configured to determine that the corresponding timestamp for a zone is less than the timestamp for a garbage collection block, wherein the zone has data in the garbage collection block, and wherein the data for the zone is valid.

4. The data storage device of claim 1, wherein the controller is configured to determine that the corresponding timestamp for a zone is equal to the timestamp for a garbage collection block, wherein the zone has data in the garbage collection block, and wherein the data for the zone is valid.

5. The data storage device of claim 1, wherein maintaining the zone timestamp table comprises updating a zone timestamp for a zone when the zone is reset and new data is written to a first logical block address (LBA) of the zone.

6. The data storage device of claim 1, wherein maintaining the zone timestamp table comprises changing a timestamp for a zone from invalid to a timestamp that matches a timestamp of a corresponding garbage collection block in which a first logical block address (LBA) of the zone is written.

7. The data storage device of claim 1, wherein adding a timestamp to each garbage block comprises adding the timestamp when the garbage collection block is allocated.

8. A data storage device supporting zoned namespace, comprising:
   a memory device; and
   a controller coupled to the memory device, wherein the controller is configured to:
   scan a garbage collection block from a last physical block address (PBA) entry backwards to a first PBA entry, wherein each PBA entry comprises a logical block address (LBA) and data;
   determine which zone a scanned PBA entry corresponds to;
   check a zone timestamp table for a valid or invalid indication for the zone;
   check the zone timestamp table for a zone timestamp corresponding to a LBA of the scanned PBA entry; and
   compare the zone timestamp to a timestamp of the garbage collection block.

9. The data storage device of claim 8, wherein determining which zone comprises shifting an LBA a number of bits to the right.

10. The data storage device of claim 8, wherein the controller is configured to initialize all zones to valid prior to host write commands.

11. The data storage device of claim 8, wherein the controller is configured to change a zone to invalid after determining a first LBA of the zone has been found to be valid.

12. The data storage device of claim 8, wherein after comparing the zone timestamp to the timestamp of the garbage collection block, the controller is configured to indicate the data is invalid when the zone timestamp is greater than the timestamp of the garbage collection block.

13. The data storage device of claim 8, wherein after comparing the zone timestamp to the timestamp of the garbage collection block, the controller is configured to indicate the data is valid when the zone timestamp is equal to or less than the timestamp of the garbage collection block.

14. The data storage device of claim 8, wherein the controller is configured to update a zone defragmentation table with a beginning PBA for each zone and number of consecutive PBAs.

15. The data storage device of claim 14, wherein the zone defragmentation table is updated prior to performing a garbage collection operation.

16. A data storage device, comprising:
a memory means; and
a controller coupled to the memory means, wherein the controller is configured to:
create and maintain a zone timestamp table;
create and maintain a zone-based defragmentation table; and
add a timestamp to each garbage collection block of the memory means.

17. The data storage device of claim 16, wherein the zone-based defragmentation table comprises:
an indication of a number of zones moved;
a zone index;
an indication of a number of fragments of data pairs; and
an index of the data pairs that are fragmented.

18. The data storage device of claim 17, wherein the index of the data pairs that are fragmented comprises a physical block address (PBA) starting location and a run length for the PBA.

19. The data storage device of claim 16, wherein the zone timestamp table comprises a timestamp corresponding to each zone.

20. The data storage device of claim 19, wherein the zone timestamp table comprises an indication of whether the zone in the garbage collection block is valid.

* * * * *